2,786,048

PROCESS FOR ACYLATING

Robert Schwyzer, Riehen, Switzerland, assignor to Ciba Pharmaceutical Products, Inc., Summit, N. J.

No Drawing. Application November 12, 1953, Serial No. 391,737

Claims priority, application Switzerland November 14, 1952

11 Claims. (Cl. 260—112)

This invention relates to and provides a new process for acylating compounds containing active hydrogen such, for example, as amines or alcohols.

Various acylation processes are known. Thus, a compound of the kind described above may be reacted with an acid or a functional derivative thereof. It is also known to react thiolcarboxylic acids or esters thereof with amines or alcohols. However, these processes have various disadvantages. Only poor yields of the acyl compounds are obtained with some starting materials. In many cases it is impossible to bring about acylation. Thus, for example, aminoalkylthiolcarboxylic acid alkyl esters cannot be reacted with aliphatic aminocarboxylic acids in dilute aqueous solution to form the desired peptides.

It has now been found that acylations can be carried out in an advantageous manner by reacting a thiolcarboxylic acid ester with a compound containing active hydrogen in the presence of a metal compound capable of forming complexes. The present invention, accordingly, is for a process of acylation which comprises reacting a thiolcarboxylic acid ester with a compound containing active hydrogen in the presence of a complex-forming metal compound.

In so far as has been determined, it appears that any thiolcarboxylic acid ester can be employed in the novel process and any compound containing active hydrogen. Thus the thiolcarboxylic acid esters may belong to the aliphatic, alicyclic, aromatic, araliphatic or heterocyclic series. Especially suitable are thiolcarboxylic acid esters, for example, those obtainable by the process of U. S. patent application Serial No. 363,649, filed June 23, 1953, which comprises reacting an N-acyl-alkylene-imine with a thiolcarboxylic acid or those obtainable by the process of U. S. patent application Serial No. 391,738, filed on even date herewith, which comprises the preparation of aminothiolcarboxylic acid esters containing a substituent which attracts electrons such as aminothiolcarboxylic acid-carboxyalkyl esters. Thiolcarboxylic acid-acylaminoalkyl esters and thiolcarboxylic acid-carboxyalkyl esters can be advantageously employed in the process. Examples of compounds containing active hydrogen are those which contain a hydroxyl or amino group, for example, aliphatic, alicyclic, aromatic, araliphatic or heterocyclic amines or alcohols. Since the process permits the ready production of peptides, there are used more especially those starting materials which lead to peptides, e. g., esters of aminoalkylthiolcarboxylic acids and aliphatic aminocarboxylic acids.

Examples of metal compounds capable of forming complexes are more especially those of silver, mercury, lead, or copper, for example, the oxides, hydroxides, nitrates, chlorides, sulphates, or acetates of these metals.

The process is advantageously carried out in the presence of a solvent. A special advantage of the process is that it permits working in an aqueous medium and at high dilutions at room temperature. When carried out in this manner the reaction proceeds rapidly and under mild conditions. Thus the process permits carrying out acylations under physiological conditions i. e. in aqueous solution under conditions, e. g. of temperature and pH, as are prevailing in the living cell. This is of great importance for the preparation of peptides. Furthermore, the process of the invention leads to good yields, especially when conducted at a pH value ranging from 3 to 11. Other advantages of the novel process are that the thiolcarboxylic acid esters used as starting materials can easily be obtained by methods in themselves known or by the processes of the aforesaid applications and that the esters especially are very stable compounds.

The following examples illustrate the invention, the parts being by weight unless otherwise stated and the relationship of parts by weight to parts by volume being the same as that of the gram to the cubic centimeter:

Example 1

0.243 part of thiolhippuric acid carboxymethyl ester (benzoylaminomethyl-thiolcarboxylic acid carboxymethyl ester) is dissolved with 0.10 part of glycine in 7 parts by volume of water, and a solution of 0.170 part of silver nitrate in 3 parts by volume of water and a 1 N-solution of caustic soda are alternately introduced dropwise in such manner that the pH value is maintained at 6.0. The solution is then made up to 14 parts by volume of water and allowed to stand for 15 hours at 40° C. For the purpose of working up, the precipitate consisting of silver thioglycollate is filtered off, the filtrate is evaporated under reduced pressure, and the residue is recrystallized from a small amount of water with acidification to produce a pH value of 2. After recrystallization from water and washing with absolute alcohol, hippurylglycine melting at 206–206.5° C. is obtained in a yield of 85 percent. The reaction may be carried out at a different pH value by adjusting the solutions to pH values of 7.3 and 8.1 by means of citrate-borate buffers. In this manner the yields given in the following table are obtained:

| pH value of the batch: | Yield, percent |
|---|---|
| 2.3 | 30 |
| 4.0 | 65 |
| 6.0 | 85 |
| 7.3 | 67 |
| 8.1 | 30 |

The reaction may be represented by the following formulae

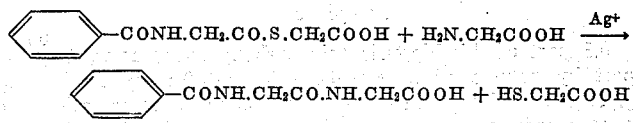

The thiolhippuric acid carboxymethyl ester used as starting material is prepared from the mixed anhydride from 1.8 parts of hippuric acid and carbonic acid monoethyl ester by reaction with 1.0 part of triethylamine and 0.9 part of thioglycollic acid in ethyl acetate at 0° C. The compound can be recrystallized from ether and melts at 139° C.

In an analogous manner thiolhippuric acid-β-carboxyethyl ester, thiolhippuric acid-β-carboxypropyl ester and carbobenzoxyaminomethyl-thiol-carboxylic acid carboxymethyl ester can be prepared and reacted with glycine.

Example 2

0.360 part of thiolbenzoic acid-pantothenylamino ethyl ester [(+)-S-benzoylpantetheine] is reacted with 0.025 part of glycine in 10 parts by volume of water with the addition of 0.170 part of silver nitrate and the alternate addition of acetic acid and caustic soda solution in a manner analogous to that described in Example 1 at pH values of 2, 3, 4, 5, 6, 7, 8 and 9. The products are isolated in the manner described in Example 1, and the benzoylglycine prepared at a pH value of 7 is obtained in a yield of about 80 percent. The reaction may be represented as follows:

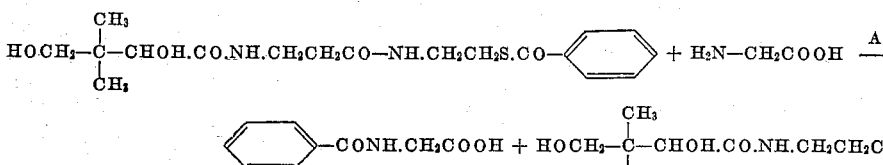

If the reaction is carried out in the same manner, but without the addition of silver nitrate, no benzoylglycine is formed.

Example 3

0.240 part of thiolhippuric acid carboxymethyl ester is dissolved in 8 parts by volume of methyl alcohol, and a solution of 0.17 part of silver nitrate in methyl alcohol is added. A slightly yellowish precipitate of silver thioglycollate is formed immediately. The precipitate is filtered off, and the solution is neutralised with one equivalent of sodium acetate in methanol, and the solution is evaporated to dryness in vacuo. The residue is treated with absolute alcohol and hippuric acid methyl ester melting at 80° C. is isolated from the extract. The reaction may be represented as follows:

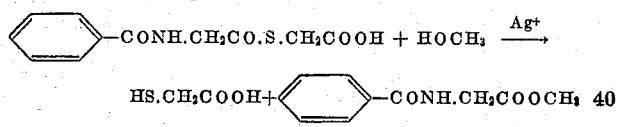

Example 4

0.25 part of thiolhippuric acid carboxymethyl ester and 0.10 part of glycine are dissolved in 6 parts by volume of a citrate-borate-HCl buffer having a pH value of 6, and mixed with 0.16 part of mercury acetate in 4 parts by volume of water. After the mixture has been kept for 15 hours at room temperature the mercury is precipitated with hydrogen sulphide and filtered off. The filtrate is evaporated in vacuo to leave a residue which consists of a small amount of hippuric acid and about 80 percent of the theoretical yield of hippurylglycine, calculated on the thiolhippuric acid carboxymethyl ester. After crystallization from an aqueous solution rendered acid to Congo and washing with boiling ethyl acetate and cold absolute alcohol the product melts at 207° C. and gives no melting point depression in admixture with authentic material.

Example 5

0.3 part of thiolhippuric acid carboxymethyl ester, 1 part by volume of 2 N-acetic acid and 0.15 part of glycine are mixed with 4 parts by volume of water and caustic soda solution added dropwise until the desired pH value is reached and all of the substance is in solution. 3 parts by volume of lead acetate solution are then added dropwise and the pH value maintained at the desired level by the simultaneous addition of 1 N-caustic soda solution. The reaction mixture is allowed to stand at room temperature for at least 3 hours and hydrogen sulphide then introduced, the lead sulphide filtered off, and from the filtrate any unreacted thiolhippuric acid carboxymethyl ester is isolated by acidification to pH 3, evaporation to dryness and extraction with ethyl acetate. From the portion which is insoluble in ethyl acetate pure hippurylglycine of melting point 206–206.5° C. is obtained by crystallization from water. The yields thus obtained are as follows, calculated on the reacted thiolhippuric acid carboxymethyl ester:

| pH: | Percent yield |
| --- | --- |
| 5 | 8.6 |
| 7 | 9 |
| 8 | 80 |

Example 6

0.1 part of (+)-S-benzoylpantetheine is dissolved in 2 parts by volume of dimethylformamide and the solution mixed with a solution of 0.2 part of aniline and 0.5 part by volume of dimethylformamide in 5 parts by volume of water. After the addition of 0.05 part of silver nitrate the solution is made up to 10 parts by volume with acetate buffer. The pH value is 7.7. The reaction mass is allowed to stand at 40° C. for 24 hours, then cooled, and the resultant benzanilide filtered off. To judge by its melting point, which is at 159–160° C., the compound is nearly pure. Purest benzanilide melts at 161° C. The yield is 0.05 part by weight or 95 percent of the calculated quantity.

Example 7

By a procedure analogous to that of Example 6, but with the use of 0.03 part of glycine instead of the aniline and of 0.07 part of copper acetate instead of the silver nitrate, there is obtained 0.012 part of hippuric acid of melting point 190° C. which corresponds to a total yield of 25 percent.

Example 8

3.0 parts of thiohippuric acid-β-carboxy ethyl ester and 1.5 parts of glycine are dissolved exactly as described in Example 1 and treated with silver nitrate at a pH of 6. 1.5 parts of hippuryl glycine of melting point 205–207° C. can be isolated, which amount to a yield of about 56 percent.

Instead of with the amines mentioned in the foregoing examples, the reaction can be carried out with benzylamine, aminopyridine, ethylene diamine, isonicotinic acid hydrazide, alanine, serine, cystine, aminobutyric acid, methionine, valine, leucine, phenyl-alanine, tyrosine, tryptophane, histidine, δ-carbobenzoxy-ornithine, asparagine, aparaginic acid, glutamic acid proline, diglycine, alanylglycine, methionyl-glycine, or glutathione.

How a considerably better yield is obtained according to the present process than without the addition of metal compounds can be seen from the following examples.

Example 9

Two solutions are prepared each of 0.2 part of thiolbenzoic acid-phenyl ester and 0.4 part of aniline in 18 parts by volume of alcohol. In experiment A one of these solutions is mixed with 2 parts by volume of water, and in experiment B the other is mixed with a solution of 0.24 part (1.5 molecular equivalents) of silver nitrate in 2 parts by volume of water. Both of these solutions are kept in a thermostat bath at 40° for 36 hours.

In experiment A, the solution is then evaporated to dryness under reduced pressure and the residue taken up in a small amount of water and acidified with hydrochloric acid. The colorless crystalline precipitate is separated by means of petroleum ether into thiolbenzoic acid-phenyl ester (0.164 part) and benzanilide of melting point 160° C. The yield of benzanilide amounts to 0.015 part or 8 percent of the calculated yield.

In experiment B the solution is freed by filtration from a voluminous precipitation of the silver salt of thiophenol and worked up in a similar manner to experiment A. The acidified aqueous solution is extracted with ethyl acetate, the extract washed with sodium bicarbonate solution, dried and evaporated. The residue is benzanilide (melting point 160–161° C.). The yield is 0.172 part or 93 percent of the calculated quantity.

The reaction is illustrated by the equation

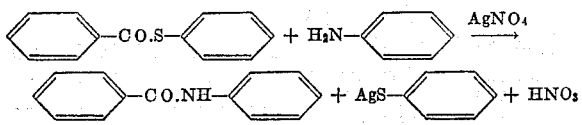

Example 10

For each batch 0.2 part of thiolbenzoic acid-phenyl ester and 0.40 part of aniline are dissolved in 10 parts by volume of absolute ethanol and mixed with 2 parts by volume of water containing the respective added substances listed in the table below. The reaction mixtures are then allowed to stand at 40° C. for 36 hours and, after filtering off any precipitate, evaporated to dryness in vacuo. The residue is taken up in a small amount of water, acidified and extracted with ethyl acetate. On being washed with bicarbonate solution, dried and evaporated, the ethyl acetate extracts leave behind the neutral portions from which unreacted thiolbenzoic acid-phenyl ester can be removed, by means of petroleum ether. Recrystallization of the insoluble portion yields the reaction product benzanilide. From the bicarbonate solution, benzoic acid, the hydrolysis product, is separated by acidification.

The experiments give the following results:

| Addition | Thiolbenzoic acid-phenyl ester | Benzoic acid | Benzanilide |
| --- | --- | --- | --- |
| None | 0.164 part; 82%, melting point, 55–56° C. | | 0.015 part; 8%, melting point, 160–161° C. |
| 0.238 part AgNO₃ | | | 0.172 part, 93%, melting point, 160–161° C. |

A reaction period of 63 hours gives the following results:

| Addition | Thiol-benzoic acid phenyl ester | Benzoic Acid | Benzanilide |
| --- | --- | --- | --- |
| None | 0.151 part; 75%, melting point, 55–56° C. | 0.007 part; 6%, melting point, 117–118° C. | 0.013 part; 7%, melting point, 146–147° C. |
| 0.532 part Lead acetate 3H₂O | 0.063 part; 31%, melting point, 55–56° C. | 0.005 part; 4%, melting point, 116–118° C. | 0.045 part; 24%, melting point, 157° C. |
| 0.280 part Copper acetate H₂O | 0.120 part; 60% | 0.014 part; 12%, melting point, 117–118° C. | 0.058 part; 32%, melting point, 159° C. |
| 0.447 part Mercury acetate | 0.010 part; 5%, melting point, 55–56° C. | 0.009 part; 8%, melting point, 105–110° C. | 0.130 part; 71%, melting point, 150–153° C. |

Example 11

For each batch, 0.1 part (+) S-benzoyl-pantetheine and 0.2 part of aniline are dissolved in 2.5 parts by volume of dimethylformamide and 5 parts by volume of water. After the addition of 1 part by volume of 2 N-acetic acid the pH is adjusted to 7.5 to 8 with caustic soda solution. The additives are then dissolved in 1 cc. of water and introduced, whereupon the pH of the reaction mixture is again adjusted with acetic acid and caustic soda solution. The individual solutions are made up to about 12 parts by volume with water. They are then allowed to stand at 40° C. for 24 hours for the reaction to take place. The solutions are then acidified with 2 N-nitric acid and extracted several times with ethyl acetate. The ethyl acetate extracts are washed with bicarbonate solution and the resulting benzoic acid freed from these extracts by acidification. The washed ethyl acetate extracts are dried and evaporated to dryness. From the residues the benzanilide which has formed can be extracted with ether. It is crystallized from methanol with the addition of a small quantity of water. The portion which is insoluble in ether yields on crystallization from ethyl acetate unreacted benzoyl-pantetheine. The results obtained with silver nitrate and mercury acetate are shown in the table below.

| Addition | Benzoyl-pantetheine | Benzoic Acid | Benzanilide |
| --- | --- | --- | --- |
| None | 0.049 part; 49%, melting point, 115° C. | | |
| NaOH up to pH 9. | not isolated | 0.014 part; 44%, melting point, 118° C. | |
| 0.053 part silver nitrate. | | | 0.049 part; 94%, melting point, 160° C. |
| 0.100 part mercury acetate. | | a trace | 0.022 part; 42%, melting point, 160° C. |

Example 12

1 part by volume of 0.2-m. solution of choline acetate, 1 part by volume of 0.2-m. solution of (+)S-acetyl-pantetheine, and 1 part by volume of 0.2 N-solution of silver nitrate are added to 7 parts by volume of water, and the solution kept at room temperature for several days. Hydrogen sulfide is then introduced, the silver sulfide removed by centrifuging and the supernatant solution boiled for a short time to expel the hydrogen sulfide (experiment 1).

For the purpose of comparison, the three following batches are treated in exactly the same manner: one with choline acetate and acetyl-pantetheine without silver (experiment 2); one with choline acetate alone (experiment 3); and one with acetyl pantetheine alone (experiment 4).

In the pharmacological determination by means of the ileum of the rabbit, the products of experiments 3 and 4 are found to be ineffective, whereas those of experiments 1 and 2 are found to contain acetyl choline. In experiment 1 the yield is 50% higher than in experiment 2.

Accordingly, the silver salt, even in syntheses where the dilution is very great, still has a specific effect.

What is claimed is:

1. In an acylation reaction wherein a thiolcarboxylic acid ester is reacted with a member selected from the group consisting of amines having at least one hydrogen atom at the nitrogen atom and alcohols, the improvement which comprises employing as a catalyst a member selected from the group consisting of silver, mercury, lead and copper salts soluble in the solvents used in the reaction, said catalyst being used at least in an equimolar amount to form the corresponding metal complex of the mercapto compound formed in the course of the reaction.

2. A process according to claim 1, wherein a silver salt is used.

3. A process according to claim 1, wherein a mercury salt is used.

4. A process according to claim 1, wherein a lead salt is used.

5. A process according to claim 1, wherein a thiolcarboxylic acid-acylaminoalkyl ester is employed as the thiolcarboxylic acid ester.

6. A process according to claim 1, wherein a thiolcarboxylic acid-carboxyalkyl ester is employed as the thiolcarboxylic acid ester.

7. A process according to claim 1, wherein an aminothiolcarboxylic acid-carboxylalkyl ester is employed as the thiolcarboxylic acid ester.

8. A process according to claim 1, wherein compounds forming peptides are employed as the starting materials.

9. In a process for the preparation of a peptide wherein an aminoalkylthiolcarboxylic acid ester is reacted with an aliphatic aminocarboxylic acid having at least one hydrogen atom at the nitrogen atom, the improvement which comprises employing as a catalyst a member selected from the group consisting of silver, mercury, lead and copper salts soluble in the solvents used in the reaction, said catalyst being used at least in an equimolar amount to form the corresponding metal complex of the mercapto compound formed in the course of the reaction.

10. In an acylation reaction wherein an aminoalkylthiolcarboxylic acid ester is reacted with an aliphatic aminocarboxylic acid having at least one hydrogen atom at the nitrogen atom, the improvement which comprises employing a silver salt soluble in the solvents used in the reaction as a catalyst, said catalyst being used at least in an equimolar amount to form the corresponding metal complex of the mercapto compound formed in the course of the reaction.

11. In an acylation reaction wherein an aminoalkylthiolcarboxylic acid ester is reacted with an aliphatic aminocarboxylic acid having at least one hydrogen atom at the nitrogen atom, the improvement which comprises employing silver nitrate as a catalyst, said catalyst being used at least in an equimolar amount to form the corresponding metal complex of the mercapto compound formed in the course of the reaction.

References Cited in the file of this patent

UNITED STATES PATENTS

| | | |
|---|---|---|
| 2,460,823 | Hartough et al. | Feb. 8, 1949 |
| 2,492,629 | Hartough et al. | Dec. 27, 1949 |
| 2,609,380 | Goldstein et al. | Sept. 2, 1952 |
| 2,709,164 | Wieland | May 24, 1955 |

FOREIGN PATENTS

| | | |
|---|---|---|
| 285,095 | Great Britain | May 3, 1929 |

OTHER REFERENCES

Foster: "Inorganic Chem. for Colleges," Van Nostrand, 2nd ed., p. 277 (1936).